K. FUCHS.
TEST GLASS FOR HEMOGLOBINOMETERS.
APPLICATION FILED JUNE 8, 1920.

1,400,356.

Patented Dec. 13, 1921.

Inventor
Karl Fuchs
B. W. Williamson
Atty.

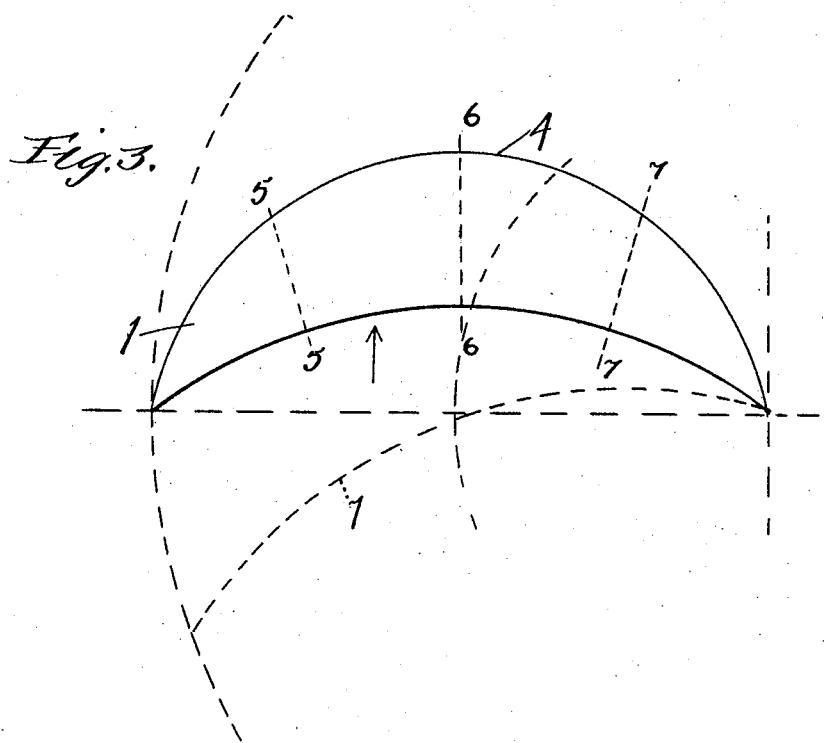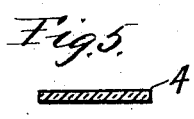

UNITED STATES PATENT OFFICE.

KARL FUCHS, OF ATCO, NEW JERSEY.

TEST-GLASS FOR HEMOGLOBINOMETERS.

1,400,356. Specification of Letters Patent. Patented Dec. 13, 1921.

Application filed June 8, 1920. Serial No. 387,389.

*To all whom it may concern:*

Be it known that I, KARL FUCHS, a citizen of the United States, residing at Atco, in the county of Camden and State of New Jersey, have invented new and useful Improvements in Test-Glasses for Hemoglobinometers, of which the following is a specification.

My invention relates to a new and useful improvement in test glasses for hemoglobinometers and the method of producing the same, and has for its object to provide a test glass which consists of a single glass comprising two prisms so blended together that when properly mounted upon the scaled revolving disk of a hemoglobinometer described through any portion thereof from the center of the disk will produce a decreasing or increasing scale of color density which will exactly correspond with the scale upon the revolving disk, that is to say when the disk is turned beneath the observation hole in the hemoglobinometer the light passing through said hole and the test glass will vary in color exactly in proportion to the degree to which the test glass has been turned thus exactly corresponding with the scale upon the disk.

A further object of my invention is to utilize a particular method for grinding the test glass in order that a compound prism will be produced from a single piece of glass and produce a constant variance of density of color to the passage of light upon the path of any circle drawn from the center of the disk when the test glass is to be mounted.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 3, is an enlarged view of the test glass after being ground, a portion of the circle being shown in connection therewith the dotted lines indicating the position the test glass will assume when applied to the disk.

Fig. 4, is an edge view of the test glass looking in the direction of the arrow in Fig. 3.

Fig. 5 is a section at the line 5—5 of Fig. 3.

Fig. 6, is a section at the line 6—6 of Fig. 3.

Fig. 7, is a section at the line 7—7 of Fig. 3.

Heretofore it has been the practice to make the test glasses, for hemoglobinometers utilizing a rotary disk, in two pieces so as to produce two prisms each being ground reverse from the other in order that when they are notched together a double prism is provided, but this method necessitates the joining of the edges of the two prisms and therefore makes a break at this joint which affects the passage of the light therethrough and interferes with the testing. This I overcome by setting the test glass at an angle other than a right angle to the base and after grinding the glass at this offset angle I secure it to the rotary disk in a position which would correspond to the vertical from the base line. In carrying out this method I secure the crescent shaped test glass 1 to the ground, by cement or otherwise, to a holder 2 said holder preferably being a sheet of glass and in so securing the test glass it is set at an angle relative to an imaginary base line indicated at 3 and then ground in the direction of the arrow in Fig. 2 or parallel with the vertical line 8 which is at right angles to the base line on a taper which produces the wedge shape indicated in Fig. 4 and as is evident the greater the angle at which the glass is set while being ground the thicker its center, indicated by the curved dotted lines 9 relative to the thickness of the glass at the base line 3 therefore the setting of the test glass relative to the base line determines the thickness thereof at this central point, which latter corresponds to the center of the scale 5 marked upon the rotary disk 6, and when the relative thickness of the center of the test glass has been properly determined, relative to the thickness at the base line, the color density of the test glass will correspond in exact degree with the scale when reset upon the rotary disk in such position as to bring both its ends, in effect, to the vertical line 8.

Figure 1:
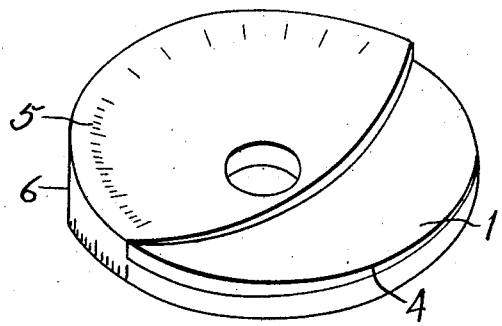
Figure 1, is a perspective of a disk such as used in hemoglobinometers showing my improved test glass applied thereto.
Figure 2:
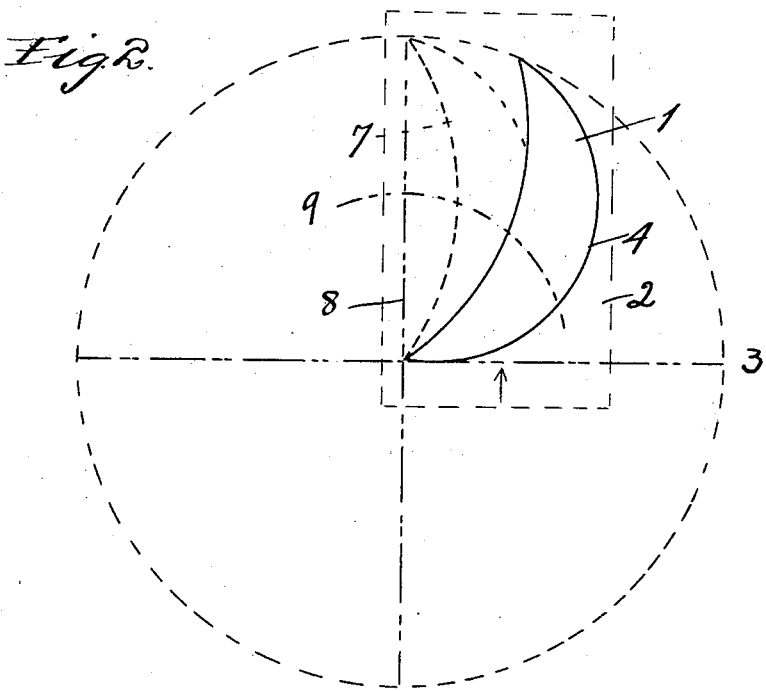
Fig. 2, is a diametrical view showing the position of a test glass to be ground relative to a circle the horizontal diameter of which being considered as the base.

After the glass has been thus ground it is removed from the holder 2 and secured by cement, or otherwise, to the rotary disk 6 in a position which corresponds to the dotted lines 7 in Fig. 2, and this resetting of the test glass when applied to the holder will produce the same effect as two prisms ground in reverse directions and reversed and placed together as has heretofore been the custom.

In grinding the test glass as above described not only will a double prismatic effect be produced, but the outer circumference of the glass will be thicker than any corresponding point upon the inner edge thereof so that the path of the passage of the light therethrough when it is reset will exactly correspond to the scale upon the disk indicating the color density and as the glass is ruby in color the variances in this color density will correspond to the variance of color in different bloods.

Having thus fully described my invention, what I claim as new and useful is:—

1. As a new article of manufacture, a test glass for hemoglobinometers of the character described consisting of two prisms formed from one piece of ruby glass of wedge shape.

2. A prism for hemoglobinometers comprising a crescent shaped piece of glass having one face beveled from a point on its convex edge adjacent one end toward its opposite end and from its convex edge toward its concave edge.

3. A hemoglobinometer prism comprising a crescent shaped single piece of ruby glass increasing in thickness from a knife edge at one end toward a point on its convex edge adjacent its opposite end.

In testimony whereof, I have hereunto affixed my signature.

KARL FUCHS.